United States Patent Office 3,713,016
Patented Jan. 23, 1973

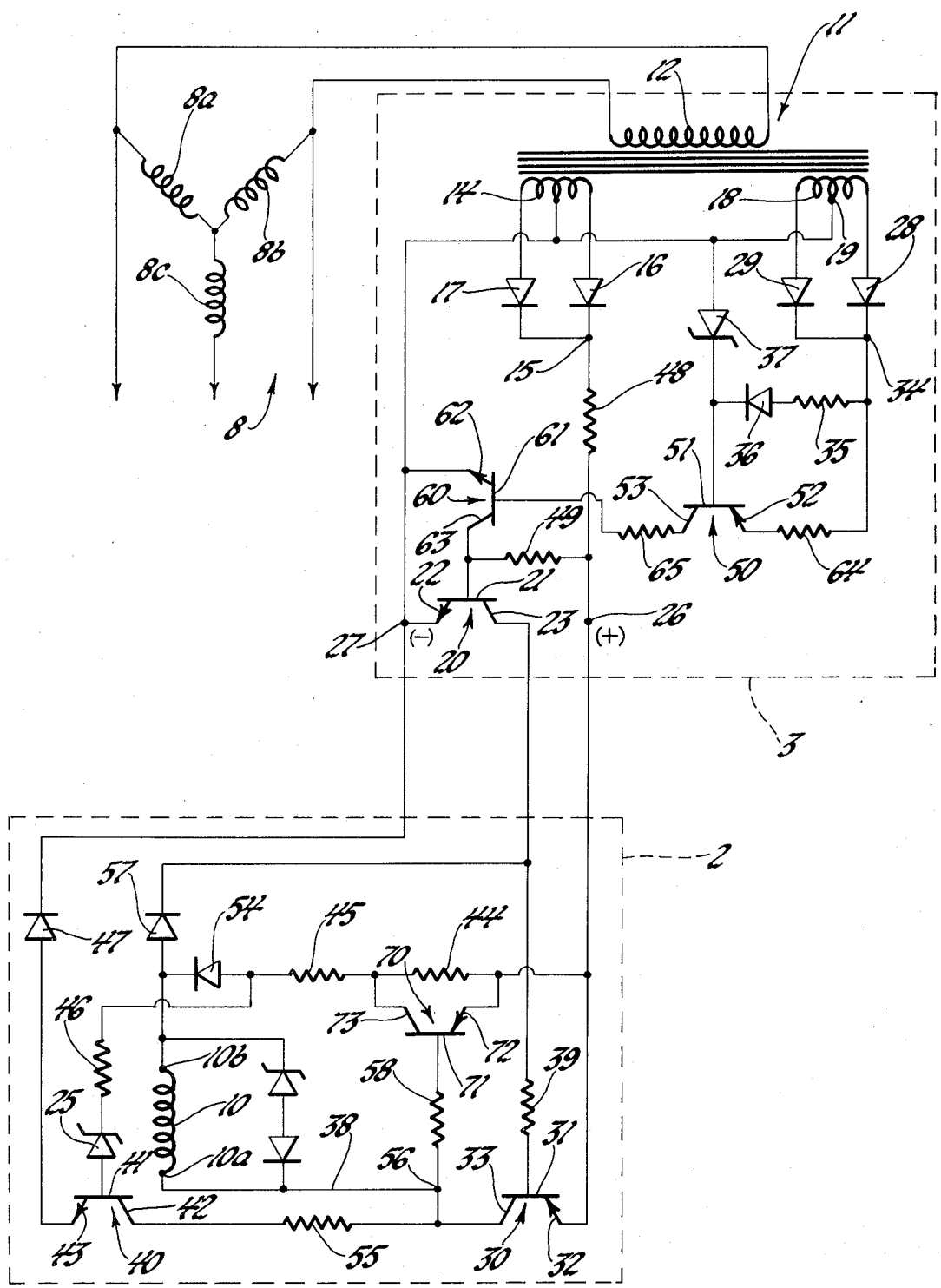

3,713,016
GENERATOR FIELD COIL ENERGIZING
REVERSING CIRCUIT
Richard N. Lehnhoff, Dayton, Ohio, assignor to General
Motors Corporation, Detroit, Mich.
Filed Feb. 3, 1972, Ser. No. 223,095
Int. Cl. H02p 9/30
U.S. Cl. 322—28                                              5 Claims

ABSTRACT OF THE DISCLOSURE

A generator field coil energization reversing circuit for use with a generator of the type having a field coil and in combination with an associated potential regulator of the type responsive to generator output potential reaching a predetermined magnitude to operate an associated control switch to the electrical circuit open condition. The generator field is connected across a source of direct current generator field coil energizing potential in one polarity relationship through the current carrying electrodes of a forward direction generator field coil switching transistor and the potential regulator control switch, the transistor being conductive only while the control switch is conductive, and in a reverse polarity relationship through the current carrying electrodes of a reverse direction generator field coil switching transistor which is responsive to conditions of generator output over-potential to become conductive.

---

This application contains substantially the same subject matter as copending application Ser. No. 70,427, filed Sept. 8, 1970.

This invention is directed to a generator field coil energization reversing circuit.

Upon the sudden loss of generator load, the output potential increases sharply in magnitude. With certain applications, this rapid increase of output potential may be intolerable. To prevent an abnormal rise of output potential upon the loss of generator load, a circuit which is responsive to generator over-potential conditions to quickly reverse the direction of energizing current flow through the generator field is desirable.

It is, therefore, an object of this invention to provide a generator field coil energization reversing circuit.

It is another object of this invention to provide an improved generator field coil energization reversing circuit responsive to generator output over-potential conditions for reversing the direction of energizing current flow through the generator field coil.

It is another object of this invention to provide an improved generator field coil energization reversing circuit responsive to generator output over-potential conditions for reversing the direction of energizing current flow through the generator field coil and employing only solid state components.

In accordance with this invention, a generator field coil energization reversing circuit is provided wherein the generator field coil is energized by a source of direct current generator field coil energizing potential in a first polarity relationship with normal generator output potential conditions and in a reverse polarity relationship with generator output over-potential conditions.

For a better understanding of the present invention, together with additional objects, advantages, and features thereof, reference is made to the following description and accompanying single figure drawing which sets forth the generator field coil energization reversing circuit of this invention in schematic form.

Referring to the figure, the generator field coil energization reversing circuit of this invention is set forth in schematic form within dashed rectangle 2 in combination with a generator 8 having a field coil 10, a potential regulator circuit, shown within dashed rectangle 3, of the type responsive to the generator output potential reaching a predetermined magnitude to operate an associated control electrical switching device, may be type NPN transistor 20, to the electrical circuit open condition and a source of direct current generator field coil energizing potential and includes a forward direction generator field coil electrical switching device, may be type PNP transistor 30, a generator output over-potential sensing means, may be a Zener diode 25, and a reverse direction generator field coil electrical switching device, may be a type NPN transistor 40.

For purposes of this specification and without intention or inference of a limitation thereto, the generator with which the generator field coil energization reversing circuit of this invention may be used is set forth as a three-phase alternator having output windings 8a, 8b and 8c and a shunt field coil 10. For the purpose of reducing drawing complexity, the generator shunt field coil 10 has been shown separate from the generator output windings, however, it is to be specifically understood that the output windings of generator 8 are arranged to cut the magnetic flux produced by a flow of energizing current through shunt field coil 10 to induce a three-phase potential therein in a manner well known in the generator art.

A convenient source of direct current generator field coil energizing potential may be a full-wave rectified output phase of generator 8, as shown in the figure, or any other convenient and satisfactory direct current potential source. The primary winding 12 of a transformer 11 is connected across the output terminals of the alternator output windings 8a and 8b, as shown in the figure, or across the output terminals of any other pair of generator output windings. The flux produced by the flow of alternating current energizing current through primary winding 12 induces a potential in center tapped secondary winding 14 of transformer 11. The alternating current potential induced in secondary winding 14 is full-wave rectified by diodes 16 and 17 and appears as a direct current potential of a positive polarity upon output terminal 26 and a negative polarity upon output terminal 27.

The potential regulator circuit responsive to the generator output potential reaching a predetermined magnitude to operate an associated control electrical switching device to the electrical circuit open condition may be any conventional potential regulator well known in the art. For purposes of this specification, and without intention or inference of a limitation thereto, one example of a potential regulator circuit of this type suitable for use with the generator field coil energization reversing circuit of this invention is schematically set forth within dashed rectangle 3 of the figure. The flow of alternating current energizing current through primary winding 12 of transformer 11 induces an alternating current potential in center tapped secondary winding 18 thereof which is full-wave rectified by diodes 28 and 29 and appears as a direct current potential of a positive polarity upon output terminal 34 and of a negative polarity upon center tap 19 of secondary winding 18. This generator output sensing potential is impresed across the series combination of resistor 35 and blocking diode 36. Zener diode 37, connected between the base electrode 51 of type PNP transistor 50 and center tap 19 of secondary winding 18 is selected to have an inverse breakdown potential of a magnitude equal to the predetermined maximum generator output potential. With normal generator output potential, therefore, Zener diode 37 is not conductive, a condition which interrupts the circuit through which base drive current is supplied through emitter electrode 52 and base electrode 51 of transistor 50. Consequently, transistor 50 does not conduct through the emitter electrode 52 and collector electrode 53, a condition which interrupts the circuit through which base drive current is supplied through base electrode 61 and emitter electrode 62 of transistor 60. With the base-emitter circuit of transistor 60 interrupted by the not conductive transistor 50, transistor 60 does not conduct through the collector electrode 63 and emitter electrode 62. With transistor 60 not conducting, the direct current potential appearing across terminals 26 and 27 is applied through resistor 49 across the base electrode 21 and emitter electrode 22 of type NPN control transistor 20 in the proper polarity relationship to produce base-emitter current flow through a type NPN transistor, consequently, control transistor 20 is conditioned for forward conduction through the collector electrode 23 and emitter electrode 22 thereof with normal generator output potential conditions. When the output potential of generator 8 reaches the predetermined maximum, Zener diode 37 breaks down and conducts in the reverse direction to complete the circuit for the flow of emitter-base current through type PNP transistor 50, a condition which initiates the flow of emitter-collector current therethrough to complete a circuit for the flow of base-emitter current through type NPN transistor 60. The flow of base-emitter current through transistor 60 triggers transistor 60 conductive through the collector-emitter electrodes thereof, a condition which places the base-emitter electrodes of control transistor 20 at substantially the same potential thereby rendering control transistor not conductive with generator output over-potential conditions.

Although the control electrical switching device of potential regulator 3 which is operable to an electrical open circuit condition in response to the generator output potential reaching a predetermined magnitude has been shown in the figure to be a type NPN transistor 20, it is to be specifically understood that any other electrical switching device which functions in the same manner may be substituted therefor without departing from the spirit of the invention.

The forward direction generator field coil electrical switching device operable to the electrical circuit open condition in response to the control electrical switching device being operated to the electrical circuit open condition by potential regulator circuit 3 is illustrated in the figure as a type PNP transistor 30 having control electrode, base electrode 31, and two current carrying electrodes, emitter electrode 32 and collector electrode 33. It is to be specifically understood, however, that an alternate electrical switching device which functions in the same manner may be substituted for transistor 30 without departing from the spirit of the invention.

Included in the generator field coil energizing reversing circuit of this invention is a generator output over-potential sensing device which may be Zener diode 25, the operation of which will be explained in detail later in this specification.

The reverse direction generator field coil electrical switching device operable to an electrical circuit closed condition in response to a generator output over-potential condition sensed by the generator output over-potential sensing device is illustrated in the figure as type NPN transistor 40 having a control electrode, base electrode 41, and two current carrying electrodes, collector electrode 42 and emitter electrode 43. It is to be specifically understood, however, that an alternate electrical switching device which functions in the same manner may be substituted for transistor 40 without departing from the spirit of the invention.

For proper operation of the circuit of this invention, the output potential of generator 8 must be applied across the generator output over-potential sensing device. In the figure, Zener diode 25 is connected in a reverse polarity relationship across a full-wave rectified output phase of generator 8 through a circuit which may be traced from positive polarity terminal 26, through series resistors 44, 45 and 46, Zener diode 25 in a reverse polarity relationship, the base-emitter electrodes of reverse direction generator field coil switching transistor 40 and blocking diode 47 to negative polarity terminal 27. This generator output over-potential sensing circuitry may also be connected across positive polarity terminal 34 and center tap 19 of the potential regulator circuit 3 or across any other generator 8 rectified output phase. With this circuit arrangement, reverse direction generator field coil switching transistor 40 is operable to the electrical circuit closed condition in response to a generator output over-potential condition sensed by Zener diode 25 in a manner to be explained in detail later in this specification. It is to be specifically understood, however, that the generator output over-potential sensing circuitry set forth in the figure is only one example of this circuitry which may be used with the generator field coil energization reversing circuit of this invention.

The current carrying electrodes, emitter electrode 32 and collector electrode 33, of forward direction generator field coil switching transistor 30, generator shunt field coil 10 and the current carrying elements, collector electrode 23 and emitter electrode 22, of control transistor 20 are connected across the source of direct current generator field coil energizing potential in a first polarity relationship. This circuit may be traced from positive polarity terminal 26, through the emitter-collector electrodes of transistor 30, lead 38, generator shunt field coil 10 from terminal end 10a to terminal 10b, blocking diode 57 and the collector-emitter electrodes of control transistor 20 to negative polarity terminal 27.

The current carrying electrodes, collector electrode 42 and emitter electrode 43, of reverse direction generator field switching transistor 40 are connected in series with generator shunt field coil 10 across the source of direct current generator field coil energizing potential in a second opposite polarity relationship. This circuit may be traced from positive polarity terminal 26, through series resistors 44 and 45, diode 54, generator shunt field coil 10 from terminal end 10b to terminal end 10a, lead 38, collector resistor 55, the collector-emitter electrodes of reverse direction generator field coil switching transistor 40 and blocking diode 47 to negative polarity terminal 27.

For the forward direction generator field coil electrical switching device, transistor 30, being operable to the electrical circuit open condition in response to the control electrical switching device, transistor 20, being operated to the electrical circuit open condition by the potential regulator circuit 3, the control electrode, base electrode 31, and a selected one of the current carrying electrodes, emitter electrode 32, of forward direction generator field coil switching transistor 30 and the current carrying elements, the collector-emitter electrodes, of the control electrical switching device, transistor 20, of potential regulator 3, are connected in series across the source of direct current generator field coil energizing potential. This circuit may be traced from positive polarity terminal 26, through the emitter-base electrodes of forward direction generator field coil switching transistor 30, base resistor 39 and the collector-emitter electrodes of control transistor 20 to the negative polarity terminal 27.

Although not absolutely necessary to the operation of the circuit of this invention, type PNP transistor 70 having a base electrode 71, an emitter electrode 72 and a collector electrode 73 may be employed for the purpose of providing a shunt electrical path around resistor 44.

The provision of this transistor will result in a current flow in the reverse direction through generator shunt field coil 10 of a magnitude greater than that if resistor 44 remains in series in this circuit. The base electrode 71 of transistor 70 is connected to junction 56 between the collector electrode 33 of forward direction generator field coil switching transistor 30 and terminal end 10a of generator shunt field 10.

With normal generator output potential conditions base drive current flows through the base-emitter electrodes of control transistor 20 of potential regulator 3 from junction 15, through resistors 48 and 49, the base-emitter electrodes of control transistor 20 and terminal 27 to the center tap of secondary winding 14, to trigger control transistor 20 conductive through the collector-emitter electrodes for the reason previously set forth. With control transistor 20 conducting through the collector-emitter electrodes, the direct current generator field coil energizing potential appearing across terminals 26 and 27 is applied across the emitter-base electrodes of type PNP forward direction generator field coil switching transistor 30 in the proper polarity relationship to produce emitter-base current flow through a type PNP transistor. The resulting emitter-base current flow through type PNP forward direction generator field coil switching transistor 30 triggers this device conductive through the emitter-collector electrodes thereof to complete a circuit through which energizing current flows in the forward direction through generator field coil 10 while the output potential of generator 8 is less than the predetermined magnitude. This circuit may be traced from positive polarity output terminal 26, through the emitter-collector electrodes of forward direction generator field coil switching transistor 30, through lead 38, generator shunt field coil 10 in a direction from terminal end 10a to terminal end 10b, blocking diode 57 and the collector-emitter electrodes of control transistor 20 of potential regulator 3 to negative polarity terminal 27.

As the base electrode 71 of type PNP transistor 70 is at substantially the same potential as the emitter electrode 72 thereof while forward direction generator field coil switching transistor 30 is conductive, emitter-base current does not flow through this device, consequently, it is not conductive. With the generator output potential of a magnitude less than the predetermined magnitude, Zener diode 25 is not conductive, therefore, the base-emitter circuit of reverse direction generator field coil switching transistor 40 is interrupted thereby, consequently, this device is not conductive.

With over-potential generator output conditions greater than the predetermined magnitude, Zener diode 37 of potential regulator 3 breaks down and conducts in a reverse direction to complete the emitter-base circuit for transistor 50 from terminal 34, through resistor 64, the emitter-base electrodes of transistor 50 and Zener diode 37 to the center tap of secondary winding 18. The resulting emitter-collector current flow through transistor 50 supplies base-emitter current for transistor 60 through resistor 65 to trigger this device conductive through the collector-emitter electrodes. Conducting transistor 60 places the base 21 and emitter 22 electrodes of control transistor 20 at substantially the same potential to extinguish control transistor 20. Extinguished control transistor 20 interrupts the circuit through which emitter-base current is supplied to forward direction generator field coil switching transistor 30. Consequently, forward direction generator field coil switching transistor 30 extinguishes and interrupts the circuit through which generator field coil 10 energizing current flows in the forward direction. At this time terminal end 10a of generator shunt field coil 10 is disconnected from positive polarity terminal 26 by extinguished forward direction generator field coil switching transistor 30 and terminal end 10b thereof is disconnected from negative polarity terminal 27 by extinguished control transistor 20.

At the same time, the generator over-potential output condition which causes Zener diode 37 to conduct in a reverse direction also causes Zener diode 25 of the circuit of this invention to break down and conduct in a reverse direction. With Zener diode 25 conducting in a reverse direction, the direct current potential appearing across terminals 26 and 27 is applied across the base-emitter electrodes of type NPN reverse direction generator field coil switching transistor 40 in the proper polarity relationship to produce base-emitter current flow through a type NPN transistor. This circuit may be traced from positive polarity terminal 26, through series resistors 44, 45 and 46, Zener diode 25, the base-emitter electrodes of reverse direction generator field coil switching transistor 40 and blocking diode 47 to negative polarity terminal 27. The resulting base-emitter current flow through type NPN reverse direction generator field coil switching transistor 40 triggers this device conductive through the collector-emitter electrodes thereof to complete a circuit for the flow of emitter-base current through type PNP transistor 70 which may be traced from positive polarity terminal 26, through the emitter-base electrodes of transistor 70, through base resistor 58, collector resistor 55, the collector-emitter electrodes of reverse direction generator field coil switching transistor 40 and diode 47 to negative polarity terminal 27, consequently, type PNP transistor 70 is triggered conductive through the emitter-collector electrodes to provide a shunt circuit around resistor 44. Conducting reverse direction generator field coil switching transistor 40 also establishes a circuit through which energizing current flows in the reverse direction through generator field coil 10 when the output potential of generator 8 reaches a predetermined magnitude. This circuit may be traced from positive polarity terminal 26, through the emitter-collector electrodes of transistor 70, resistor 45, blocking diode 54, through generator shunt field coil 10 in a reverse direction from terminal end 10b to terminal end 10a, lead 38, collector resistor 55, the collector-emitter electrodes of reverse direction generator field coil switching transistor 40 and blocking diode 47 to negative polarity terminal 27.

The flow of generator field coil 10 energizing current in the opposite direction with generator output over-potential conditions sharply reduces the magnitude of the generator output before electrical utilization devices connected thereto are damaged or destroyed.

When the generator 8 output potential falls below the predetermined magnitude, Zener diode 37 blocks the flow of emitter-base current through transistor 50 to extinguish this device. With transistor 50 extinguished, the circuit through which base-emitter drive current is supplied to transistor 60 is interrupted to extinguish transistor 60. Consequently, control transistor 20 again conducts through the collector-emitter electrodes to complete the circuit for the flow of emitter-base current flow through forward direction generator field coil switching transistor 30 and Zener diode 25 extinguishes to interrupt the circuit through which base-emitter current is supplied to reverse direction generator field coil switching transistor 40. Consequently, reverse direction generator field coil switching transistor 40 extinguishes to interrupt the circuit for the flow of energizing current through generator field coil 10 in the reverse direction and forward direction generator field coil switching transistor 30 is triggered conductive through the emitter-collector electrodes to complete the circuit through which forward energizing current flows through generator field coil 10.

While specific switching devices, transistors and electrical polarities have been set forth in this specification, it is to be specifically understood that alternate switching devices possessing similar electrical characteristics, alternate transistor types and compatible electrical polarities may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A generator field coil energization reversing circuit comprising in combination with a generator having a field coil, a potential regulator circuit responsive to the generator output potential reaching a predetermined magnitude to operate an associated normally closed control electrical switching device to the electrical circuit open condition and a source of direct current generator field coil energizing potential, a forward direction generator field coil electrical switching device operable to the electrical circuit open condition in response to said control electrical switching device being operated to the electrical circuit open condition by said potential regulator circuit, first series circuit means including said forward direction generator field coil electrical switching device and said control electrical switching device for connecting said generator field coil across said source of direct current generator field coil energizing potential in a first polarity relationship through which generator field coil energizing current flows in the forward direction while the output potential of said generator is less than a predetermined maximum, a generator output over-potential sensing means, a reverse direction generator field coil electrical switching device operable to an electrical circuit closed condition in response to a generator output over-potential condition sensed by said generator output over-potential sensing means, and second circuit means including said reverse direction generator field coil electrical switching device for connecting said generator field coil across said source of direct current generator field coil energizing potential in a second opposite polarity relationship through which generator field coil energizing current flows in the reverse direction when the output potential of said generator reaches a predetermined magnitude.

2. A generator field coil energization reversing circuit comprising in combination with a generator having a field coil and a potential regulator circuit responsive to the generator output potential reaching a predetermined magnitude to operate an associated normally closed control electrical switching device to the electrical circuit open condition, means for rectifying a selected output phase of said generator for providing a source of direct current generator field coil energizing potential, a normally closed forward direction generator field coil electrical switching device operable to the electrical circuit open condition in response to said control electrical switching device being operated to the electrical circuit open condition by said potential regulator circuit, first series circuit means including said forward direction generator field coil electrical switching device and said control electrical switching device for connecting said generator field coil across said source of direct current generator field coil energizing potential in a first polarity relationship through which generator field coil energizing current flows in the forward direction while the output potential of said generator is less than a predetermined maximum, a generator output over-potential sensing means, means for applying the potential of said rectified output phase of said generator to said over-potential sensing means, a reverse direction generator field coil electrical switching device operable to an electrical circuit closed condition in response to a generator output over-potential condition sensed by said generator output over-potential sensing means, and second circuit means including said reverse direction generator field coil electrical switching device for connecting said generator field coil across said source of direct current generator field coil energizing potential in a second opposite polarity relationship through which generator field coil energizing current flows in the reverse direction when the output potential of said generator reaches a predetermined magnitude.

3. A generator field coil energization reversing circuit comprising in combination with a generator having a field coil, a potential regulator circuit responsive to the generator output potential reaching a predetermined magnitude to operate the current carrying elements of an associated control electrical switching device to the electrical circuit open condition and a source of direct current generator field coil energizing potential, a forward direction generator field coil switching transistor having a control and two current carrying electrodes, means for connecting said control electrode and a selected one of said current carrying electrodes of said forward direction generator field coil switching transistor and said current carrying elements of said control electrical switching device in series across said source of direct current generator field coil energizing potential, first series circuit means including said current carrying electrodes of said forward direction generator field coil switching transistor, said generator field coil and said current carrying elements of said control electrical switching device for connecting said generator field coil across said source of direct current generator field coil energizing potential in a first polarity relationship through which generator field coil energizing current flows in the forward direction while the output potential of said generator is less than a predetermined maximum, a generator output over-potential sensing means, a reverse direction generator field coil switching transistor having a control electrode and two current carrying electrodes operable to an electrical circuit closed condition in response to a generator output over-potential condition sensed by said generator output over-potential sensing means, and said second circuit means including said current carrying electrodes of said reverse direction generator field coil switching transistor for connecting said generator field coil across said source of direct current generator field coil energizing potential in a second opposite polarity relationship through which generator field coil energizing current flows in the reverse direction when the output potential of said generator reaches a predetermined magnitude.

4. A generator field coil energization reversing circuit comprising in combination with a generator having a field coil, a potential regulator circuit responsive to the generator output potential reaching a predetermined magnitude to operate the current carrying elements of an associated control electrical switching device to the electrical circuit open condition and a source of direct current generator field coil energizing potential, a forward direction generator field coil switching transistor having a control and two current carrying electrodes, means for connecting said control electrode and a selected one of said current carrying electrodes of said forward direction generator field coil switching transistor and said current carrying elements of said control electrical switching device in series across said source of direct current generator field coil energizing potential, first series circuit means including said current carrying electrodes of said forward direction generator field coil switching transistor, said generator field coil and said current carrying elements of said control switching device for connecting said generator field coil across said source of direct current generator field coil energizing potential in a first polarity relationship through which generator field coil energizing current flows in the forward direction while the output potential of said generator is less than a predetermined maximum, a Zener diode, a reverse direction generator field coil switching transistor having a control electrode and two current carrying electrodes operable to an electrical circuit closed condition in response to a generator output over-potential condition sensed by said Zener diode, means for applying the output potential of said generator across the series combination of said Zener diode and said control electrode and a selected one of said current carrying electrodes of said reverse direction generator field coil switching transistor, and second circuit means including said current carrying electrodes of said reverse direction generator field coil switching transistor for connecting said generator field coil across said source of direct current generator field coil energizing potential in a second opposite polarity relationship through which generator field coil energizing current flows in the reverse direction when the output potential of said generator reaches a predetermined magnitude.

5. A generator field coil energization reversing circuit comprising in combination with a generator having a field coil, a potential regulator circuit responsive to the generator output potential reaching a predetermined magnitude to operate the current carrying elements of an associated control electrical switching device to the electrical circuit open condition and a source of direct current generator field coil energizing potential, a forward direction generator field coil switching transistor having base, collector and emitter electrodes, means for connecting said base-emitter electrodes of said forward direction generator field coil switching transistor and said current carrying elements of said control switching device in series across said source of direct current generator field coil energizing potential, first series circuit means including said collector-emitter electrodes of said forward direction generator field coil electrical switching transistor, said generator field coil and said current carrying elements of said control switching device for connecting said generator field coil across said source of direct current generator field coil energizing potential in a first polarity relationship through which generator field coil energizing current flows in the forward direction while the output potential of said generator is less than a predetermined maximum, a Zener diode, a reverse direction generator field coil switching transistor having base, collector and emitter electrodes, operable to an electrical circuit closed condition in response to a generator output over-potential condition sensed by said Zener diode, means for applying the output potential of said generator across the series combination of said Zener diode and said base-emitter electrodes of said reverse direction generator field coil switching transistor, and second circuit means including said collector-emitter electrodes of said reverse direction generator field coil switching transistor for connecting said generator field coil across said source of direct current generator field coil energizing potential in a second opposite polarity relationship through which generator field coil energizing current flows in the reverse direction when the output potential of said generator reaches a predetermined magnitude.

References Cited

UNITED STATES PATENTS

| | | | |
|---|---|---|---|
| 3,378,754 | 4/1968 | Rosenberry, Jr. | 322—28 |
| 3,521,148 | 7/1970 | Kirk et al. | 322—73 X |

J. D. MILLER, Primary Examiner

H. HUBERFELD, Assistant Examiner

U.S. Cl. X.R.

322—36, 73